Feb. 28, 1961
J. RABINOW
2,973,041
VARIABLE PITCH WINDMILL
Filed Feb. 14, 1951
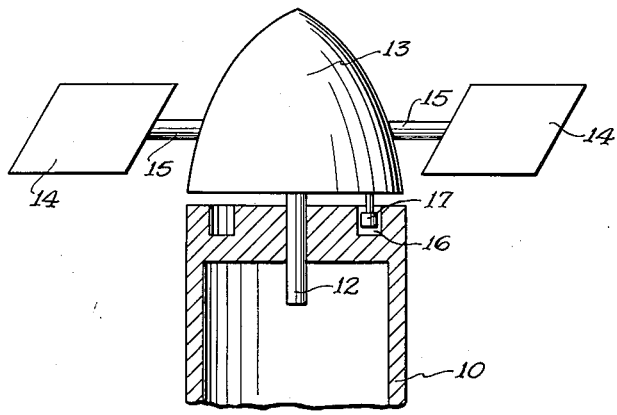
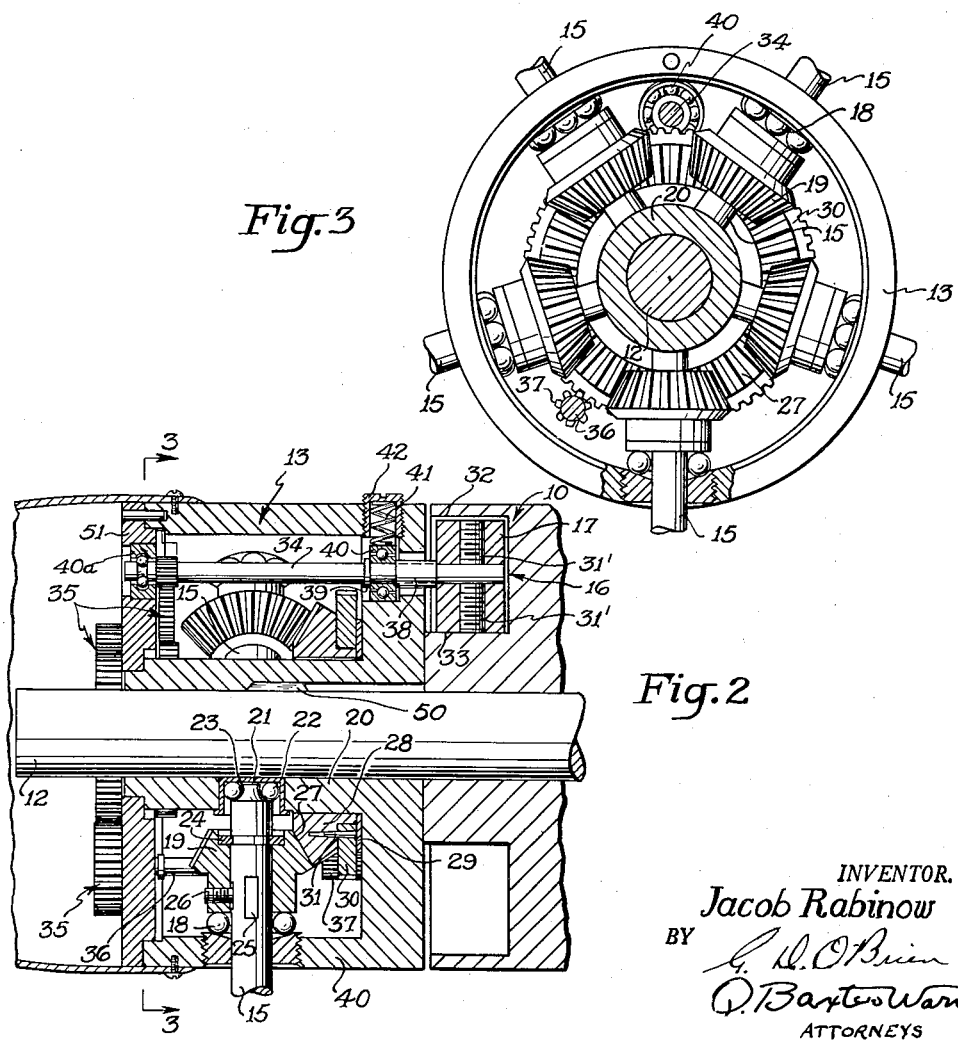
INVENTOR.
Jacob Rabinow
BY
ATTORNEYS

United States Patent Office 2,973,041
Patented Feb. 28, 1961

2,973,041
VARIABLE PITCH WINDMILL

Jacob Rabinow, Takoma Park, Md., assignor to the United States of America as represented by the Secretary of the Navy Filed Feb. 14, 1951, Ser. No. 210,905

4 Claims. (Cl. 170—68)

(Granted under Title 35, U.S. Code (1952), sec. 266)

The present invention relates generally to windmills, and is more particularly concerned with such devices having variable pitch blades or vanes to enable a substantially fixed and constant speed of revolution thereof despite variations, within limits, of the air speed relative to the windmill.

The present invention is particularly adaptable to use as the motor source of an electric power generator on missiles, aircraft, and the like where compactness, constancy of speed, and efficiency of operation are of considerable significance. Although various forms of variable pitch windmils and the like are known, they are generally of such design that considerable power is required to vary the vane pitch, or an appreciable delay is encountered before a change in rotor speed causes an alteration of the vane angle to correct that change. Also, most existing types of variable pitch windmills are bulky and not readily suited to the degree of miniaturization which is found to be important in the use of such devices in ordnance missiles or the like. The present invention overcomes the above objections to prior art devices and has the further advantages of being readily set to maintain a desired rotational speed of the windmill rotor, ease of manufacture, and low cost of manufacture and maintenance.

In its more general aspects, the present invention contemplates the provision of a plurality of variable pitch vanes extending radially from a windmill hub or rotor, the pitch of these vanes being controlled by an adjustable governor responsive through centrifugal force to variations in the speed of rotation of the windmill. The governor is designed to divert a portion of the rotational power of the windmill to vary the pitch of the vanes relative to the air stream flowing past them, increasing or decreasing the value of the vane pitch angle as the rotational speed of the windmill decreases or increases from the predetermined and desired rotational velocity for which the governor is set, thus re-establishing or maintaining the desired rotational velocity.

It is therefore one object of the present invention to provide a variable pitch windmill, wherein the rotational speed thereof may be maintained substantially at a desired rate despite variations of air speed.

Another object of the present invention is to provide a variable pitch windmill, wherein variations of the rotational speed thereof from a predetermined and desired rate are utilized to appropriately vary the pitch of the vanes to enable a substantially constant and predetermined rotational velocity despite variations in air speed.

Another object of the present invention is to provide a pitch governor for the vanes of a variable pitch windmill, for varying the pitch of the vanes in accordance with variations in the rotational velocity of the windmill from a predetermined and desired rate, to provide a substantially constant rotational velocity thereof despite variations in air current flow.

Another object of the present invention is to provide a pitch governor for the vanes of a variable pitch windmill, which is responsive to the rotational velocity of the windmill and which utilizes a small portion of the rotational force thereof to appropriately vary the pitch of the vanes in accordance with variations in rotational speed.

Other objects and advantages of the present invention will become apparent to those skilled in the art from a consideration of the following detailed description thereof had in conjunction with the accompanying drawings, in which like numerals refer to like or corresponding parts and wherein:

Fig. 1 is a schematic longitudinal view, partially in section, of an ordnance missile employing a windmill embodying the present invention;

Fig. 2 is a detailed longitudinal section of the hub of a windmill embodying the present invention; and Fig. 3 is a detailed cross-sectional view of the hub of a windmill embodying the present invention, taken substantially along the line 3—3 of Fig. 2.

As previously indicated, it is contemplated that the present invention may be used in conjunction with an ordnance missile or the like as the motive power of an electric generator, and therefore Fig. 1 shows an ordnance missile 10 having a nosepiece 13 forming the hub of a windmill embodying the present invention secured to the missile body by the shaft 12. A plurality of vanes 14, of which only two are shown in Fig. 1, are secured to the hub 13 by means of the vane shafts 15 extending radially therefrom, the shafts being axially rotatable in their hub sockets to permit change of the pitch of the vanes 14. As further shown in Fig. 1, the forward face of the missile body 10 is provided with an annular groove 16 in which a friction roller 17 rides, the function of which will subsequently become apparent.

The detailed structure of the interior of the hub 13 is shown in Figs. 2 and 3. Each vane shaft 15 is seated in a cup 21 recessed into the inner cylindrical wall 20 of the hub housing, and its seated end is shaped to provide the radial and axial thrust bearing race 23. A bevel gear 19 is seated upon each shaft 15, positioned longitudinally thereon between split ring 24 provided on the vane shaft 15 and the axial bearing 18. In addition, these bevel gears are rationally fixed to said vane shafts by keys 25 provided on each shaft and cooperating with appropriate grooves, not shown, on the bevel gears. To further insure against rotational play between the bevel gears 19 and their shafts 15, a setscrew 26 may be provided in the shank of each bevel gear bearing against the corresponding shaft 15. Each of the bevel gears 19 mesh with the bevelled surface 27 of the annular gear 28, positioned for rotation about the inner cylindrical wall 20 of the housing and abutting the bearing plate 29. A spur gear 30 is keyed to the annular gear 28 by means of pins 31 for rotation therewith. Therefore, rotation of the spur gear 30 results in rotation of the annular gear 28 therewith, whose bevelled surface 27 in turn meshes with the bevel gears 19 positioned on the vane shafts 15, to rotate the vane shafts 15 and hence their vanes 14 in accordance with the initial rotation of the spur gear 30.

Referring next to friction roller 17 and its associated mechanism, the roller is retained in position upon shaft 34 by means of setscrews 31', and if moved into contact with either the side 32 or the side 33 of groove or channel 16 when the hub 13 of the windmill is rotating with respect to the body of the missile 10, the roller is caused to rotate and in turn rotates the shaft 34 therewith. The friction roller shaft 34 is rotatably mounted in the bearings 40 and 40a and operates through a speed reduction gear train generally indicated by the numeral 35 to rotate the shaft 36, which through gear 37 affixed to one end thereof rotates the spur gear 30. As previously indicated, the rotation of gear 30 causes a corresponding rotation of the vane shafts 15 and the vanes 14 affixed thereto.

The friction roller shaft bearing 40 is collared between the two flanges 38 and 39 to restrain it against axial movement on said shaft. A coil spring 41 acts radially against the bearing 40 with a pressure determined by the setting of the spring retaining bolt 42. It is apparent from the foregoing discussion that when the hub of the windmill is caused to rotate with respect to the missile, the shaft 34 and vanes 14 are rotated in one direction when the friction roller 17 engages one side of the annular groove 16, and in the opposite direction when said friction roller engages the opposite side of said groove, remaining stationary when the roller is out of contact with either of said sides. Thus, if at a particular speed of rotation of the hub 13 of the windmill the friction roller 17 is forced into engagement with the side 33 of the groove 16, and if there is a differential in the speed of rotation between the missile 10 and the hub 13, the resultant rotation of the friction disc shaft 34 rotates the vane shafts 15 in one direction to rotate the vanes into a more and more effective pitch angle with respect to the air flow relative thereto until the rotational speed of the windmill has increased the centrifugal force acting upon the friction roller and its shaft to move said roller out of engagement with the side 33 of the groove 16, whereupon rotation of the friction roller ceases and the windmill vanes 14 remain at the adjusted pitch angle. However, should the air flow speed relative to the windmill increase so as to further increase the rotational velocity of the windmill, the increased centrifugal force acting upon the friction roller 17 and its shaft 34 causes the roller 17 to engage the side 32 of the annular groove 16, thus rotating the vane shafts 15 in the opposite direction from that had with the friction disc in engagement with the side 33 of said groove, rotating the windmill vanes 14 into a more and more ineffective pitch angle with respect to the air flow, hence decreasing the rotational velocity of said windmill until the centrifugal force acting upon said friction roller and its shaft has sufficiently decreased to cause the roller to disengage from the outer side 32 of groove 16 and be located centrally in said groove free from contact with either side thereof. Any desired rotational speed of the windmill may be had by adjusting the spring retaining bolt 42 to properly alter the inwardly directed pressure of the coil spring 41 acting through the annular bearing 40 on the friction roller shaft 34, so that regardless of air speed, within the design limits of the windmill, the hub 13 can be caused to rotate at substantially a constant speed, for the vanes 14 of the windmill assume pitch angles which provide increased rotational speed of the hub 13 at all times when its rotational speed is below the preselected value as determined by the compression of spring 41, and assume pitch angles which provide decreased rotational speed of the hub when its rotational speed exceeds the preselected value. If desired, stops (not shown) may be provided in the governing mechanism or on the vane shafts to prevent the vanes from assuming too great or too small a pitch angle under adverse conditions.

There is thus provided a substantially constant speed windmill motor enabling its application as the motive force of an electric generator, having a centrifugal force responsive governor which may be preset to provide a desired operating speed. Furthermore, since in its application to ordnance missiles the speed of rotation of the windmill relative to the missile is generally great, a large speed reduction is possible in the gear train 35 without encountering appreciable time delay between a variation in windmill speed of rotation and adjustment of the pitch of the windmill vanes, thereby providing an adequate torque for rotation of the vane shafts 15 without appreciably affecting the useful output power of the hub 13.

If desired, the hub 13 may be formed as indicated in Figs. 2 and 3, wherein an annular chamber is provided as a single molding, casting, or the like 40 for containing the governing mechanism of the present invention, and is adapted to receive an annular faceplate 51 over the open end thereof for enclosing the chamber. The shaft 12 which extends through the central cylindrical opening of the hub may be keyed or otherwise secured to the hub as the shaft driven by the windmill, or if desired, may be used as the rotational bearing about which the windmill hub rotates, other means as will be apparent being provided for accomplishing the work desired of the windmill. Modifications of the present invention will be apparent to those skilled in the art, and such modifications as are within the spirit and scope of the present invention as defined by the appended claims are within the contemplation of the present patent.

The invention described herein may be manufactured and used by or for the Government of the United States of America for governmental purposes without the payment of any royalties thereon or therefor.

What is claimed is:

1. A variable pitch windmill comprising a hub, a reference member having an annular channel formed therein, said hub being rotatable relative to said member, a friction roller carried eccentrically by said hub and positioned in said channel, the width of said channel being greater than the diameter of said friction roller, a plurality of vane carrying shafts radially extending from said hub and being axially rotatable, a gear train linking said friction roller with said vane carrying shafts for rotating said shafts in response to rotation of said friction roller, rotation of said hub thereby exerting a centrifugal force upon said friction roller tending to force said roller into engagement with one side wall of said annular channel, and adjustable resilient means carried by said hub for urging said friction roller away from said side wall and into engagement with the opposite side wall of said channel, a rotational speed of said hub greater than an amount determined by the urging force of said resilient means thereby forcing said friction roller into engagement with said first-mentioned side wall to rotate said vane carrying shafts to a less efficient vane pitch angle and a rotational speed of said hub less than said amount enabling said resilient means to force said friction roller into engagement with the second-mentioned side wall to rotate said vane carrying shafts to a more efficient vane pitch angle.

2. A variable pitch windmill comprising a hub, a reference member having an annular channel formed therein, said hub being rotatable relative to said member, a friction roller carried eccentrically by said hub and positioned in said channel, the width of said channel being greater than the diameter of said friction roller, vanes extending radially from said hub and being axially rotatable, means linking said friction roller with said vanes for rotating them in response to rotation of said friction roller, rotation of said hub thereby exerting a centrifugal force upon said friction roller tending to force said roller into engagement with one side wall of said annular channel, means urging said friction roller away from said side wall and into engagement with the opposite side wall of said channel, a rotational speed of said hub greater than an amonunt determined by said urging means thereby forcing said friction roller into engagement with said first-mentioned side wall to rotate said vanes in one direction and a rotational speed of said hub less than said amount enabling said urging means to force said friction roller into engagement with the second-mentioned side wall to rotate said vanes in the opposite direction.

3. A variable pitch windmill comprising a hub, a reference member having an annular channel formed therein, said hub being rotatable relative to said member, a rotatable friction drive means eccentrically carried by said hub and positioned in said channel, the size of said channel being sufficient to permit free travel of said drive means therein, vanes extending radially from said hub and being axially rotatable, means linking said drive means with said vanes for rotating them in response to rotation of said drive means, rotation of said hub thereby exerting a centrifugal force upon said drive means tending to force it into engagement with one wall of said channel, and means urging said drive means away from said wall and into engagement with another wall of said channel, a rotational speed of said hub greater than an amount determined by said urging means causing said drive means to engage said first-mentioned wall thereby causing said drive means to rotate in one direction and thus to rotate said vanes to a less efficient pitch angle and a rotational speed of said hub less than said amount resulting in said urging means forcing said drive means into engagement with the second-mentioned wall thereby causing said drive means to rotate in the opposite direction and thus rotating said vanes to a more efficient pitch angle.

4. A variable pitch windmill comprising two relatively rotatable members, a first of said members having a channel formed therein, rotatable means eccentrically carried by the second member and extending into said channel for movement therealong in response to relative rotation of said two members, the size of said channel being sufficient to permit free travel of said rotatable means therein, vanes extending radially from said second member and being axially rotatable, means linking said rotatable means with said vanes for rotating said vanes in response to rotation of said rotatable means, rotation of said second member thereby exerting a centrifugal force upon said rotatable means tending to force it into engagement with one wall of said channel, and means urging said rotatable means away from said wall and into engagement with another wall of said channel, a rotational speed of said second member greater than an amount determined by said urging means thereby causing said rotatable means to engage said first-mentioned wall causing said rotatable means to rotate in one direction and hence the vanes to rotate in accordance therewith and a rotational speed of said second member less than said amount enabling said urging means to force said rotatable means into engagement with the second-mentioned wall causing the rotatable means to rotate in the opposite direction and hence the vanes to rotate in accordance therewith.

References Cited in the file of this patent

FOREIGN PATENTS 400,290     Germany _____ Aug. 6, 1924